United States Patent
Trevett et al.

(10) Patent No.: US 10,207,300 B2
(45) Date of Patent: *Feb. 19, 2019

(54) ULTRASONICALLY CLEARING PRECIPITATION

(71) Applicant: EchoVista GmbH, Seligenstadt (DE)

(72) Inventors: David Robert Murray Trevett, Poole (GB); Patrick Naven Trevett, Poole (GB)

(73) Assignee: EchoVista GmbH, Seligenstadt (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/969,798

(22) Filed: May 3, 2018

(65) Prior Publication Data

US 2018/0250722 A1    Sep. 6, 2018

Related U.S. Application Data

(63) Continuation of application No. 15/003,516, filed on Jan. 21, 2016, now abandoned, which is a (Continued)

(30) Foreign Application Priority Data

Jul. 22, 2013  (GB) .................................. 1313061.2

(51) Int. Cl.
 *B08B 7/02* (2006.01)
 *B60S 1/02* (2006.01)
 *B60S 1/08* (2006.01)

(52) U.S. Cl.
 CPC .............. *B08B 7/028* (2013.01); *B60S 1/02* (2013.01); *B60S 1/0818* (2013.01)

(58) Field of Classification Search
 None
 See application file for complete search history.

(56) References Cited

U.S. PATENT DOCUMENTS 4,483,571 A    11/1984  Mishiro
5,920,167 A *   7/1999  Wiget .................. B60S 1/0818
                                                        318/444

(Continued)

FOREIGN PATENT DOCUMENTS

CN    201745541    2/2011
CN    103191886    7/2013

(Continued)

OTHER PUBLICATIONS

International Search Report and the Written Opinion dated Nov. 4, 2014 From the International Searching Authority Re. Application No. PCT/EP2014/065694. (9 Pages).

(Continued)

*Primary Examiner* — Jason Y Ko
*Assistant Examiner* — Cristi J Tate-Sims

(57) ABSTRACT

A system for clearing precipitation from a window comprises one or more transducers (1-8) fixed to the window. The transducers are driven by a generator (13) to produce surface acoustic waves that propagate through the window. The window may be a laminated window such as a windscreen (10) for a vehicle. A sensing system (122) may be used for detecting the presence of precipitation to actuate the clearing system.

11 Claims, 13 Drawing Sheets

Related U.S. Application Data continuation of application No. PCT/EP2014/065559, filed on Jul. 18, 2014.

(56) References Cited

U.S. PATENT DOCUMENTS

| | | | |
|---|---|---|---|
| 2002/0079089 A1 | 6/2002 | Kang et al. | |
| 2008/0100584 A1 | 5/2008 | Hague et al. | |
| 2008/0107542 A1 | 5/2008 | Hernandez | |
| 2010/0230991 A1* | 9/2010 | Fioravanti | B60J 1/2005 296/96.15 |
| 2013/0024169 A1* | 1/2013 | Veerasamy | B32B 17/10036 703/2 |
| 2016/0137167 A1 | 5/2016 | Trevett et al. | |
| 2016/0146721 A1 | 5/2016 | Ji et al. | |

FOREIGN PATENT DOCUMENTS

| | | | |
|---|---|---|---|
| DE | 4304498 | 8/1993 | |
| DE | 4435941 | 4/1995 | |
| DE | 10005341 | 8/2001 | |
| EP | 0512653 | 11/1992 | |
| EP | 0869055 | 10/1998 | |
| GB | 2387107 | 10/2003 | |
| JP | 08-140898 | 6/1996 | |
| JP | 09-099812 | 4/1997 | |
| JP | 10-180203 | 7/1998 | |
| JP | 10-206400 | 8/1998 | |
| JP | 2000-043682 | 2/2000 | |
| JP | 2001-359287 | 1/2001 | |
| JP | 2012-126578 | 7/2012 | |
| WO | WO 01/78912 | 10/2001 | |
| WO | WO 2012/029056 | 3/2012 | |
| WO | WO 2012/095643 | 7/2012 | |
| WO | WO-2012095643 A1 * | 7/2012 | A42B 3/26 |

OTHER PUBLICATIONS

International Search Report and the Written Opinion dated Nov. 14, 2014 From the International Searching Authority Re. Application No. PCT/EP2014/065559. (9 Pages).

International Search Report and the Written Opinion dated Nov. 25, 2014 From the International Searching Authority Re. Application No. PCT/EP2014/065691. (9 Pages).

Notice of Reasons for Rejection dated May 8, 2018 From the Japan Patent Office Re. Application No. 2016-528472 and Its Translation Into English. (8 Pages).

Official Action dated Jan. 5, 2018 From the US Patent and Trademark Office Re. U.S. Appl. No. 15/003,516. (14 Pages).

Official Action dated May 23, 2017 From the US Patent and Trademark Office Re. U.S. Appl. No. 15/003,516. (24 Pages).

Patents Act 1977: Combined Search and Examination Report Under Sections 17 and 18(3) dated Jan. 7, 2015 From the Intellectual Property Office of the United Kingdom of Great Britain Re. Application No. GB131306.2. (4 Pages).

* cited by examiner

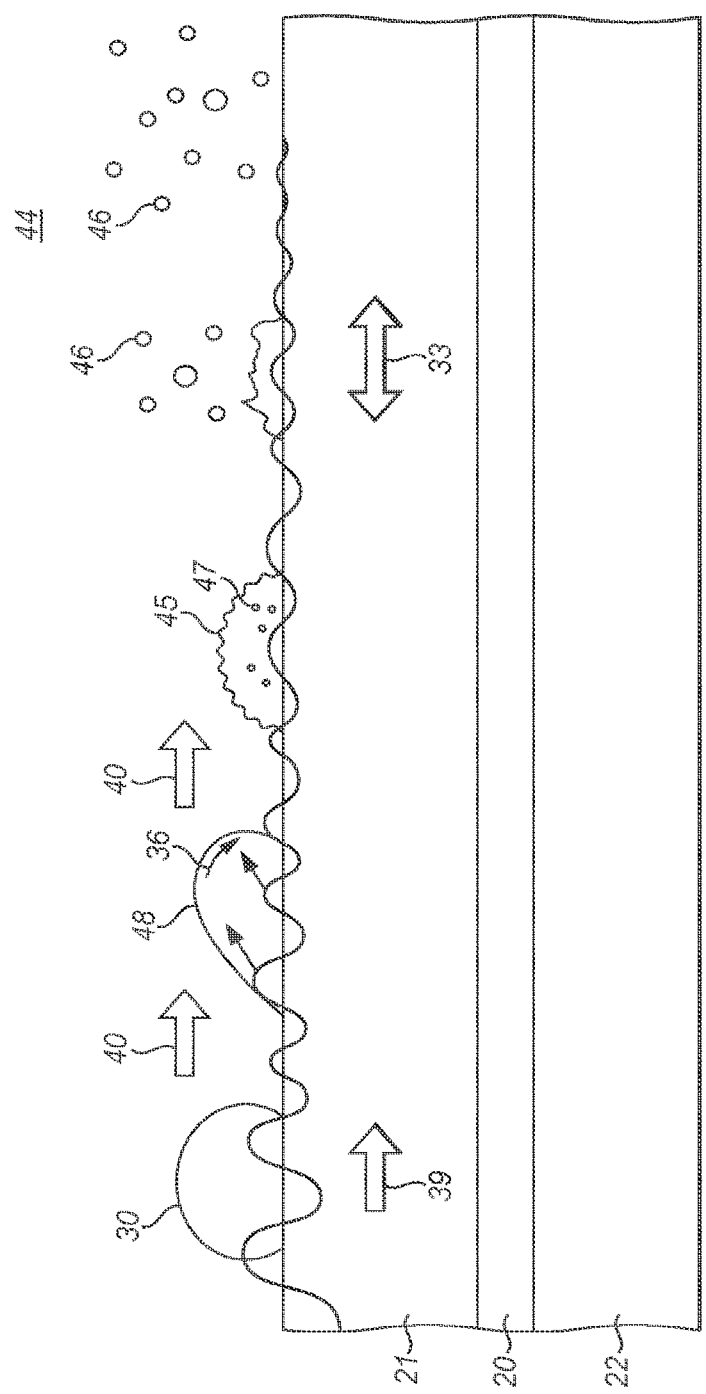

ULTRASONICALLY CLEARING PRECIPITATION

CROSS-REFERENCE TO RELATED APPLICATIONS

This application is a continuation of U.S. patent application Ser. No. 15/003,516 filed on Jan. 21, 2016, which is a National Phase of PCT Patent Application No. PCT/EP2014/065559 having International filing date of Jul. 18, 2014, which claims the benefit of priority of United Kingdom Patent Application No. 1313061.2 filed on Jul. 22, 2013. The contents of the above applications are all incorporated herein by reference.

BACKGROUND OF THE INVENTION

Field of the Invention

The present invention relates to ultrasonically clearing precipitation from a window. Embodiments of the invention relate to clearing precipitation from a laminated windscreen of a vehicle.

Description of the Related Technology

Conventionally, a driver of a vehicle uses wipers to remove precipitation from the one or more windows to maintain a clear view through the window. However, the wipers are rubber or plastic and assembled to a metal fixing with a motor and the lifetime of the wipers depend on how long it takes for the parts to perish. Commercially available products such as RainX (RTM) can be applied to the surface of a window for easy cleaning of the window. However, since the wipers contact the surface of the window they also remove products applied to the window surface when they are in use and further application of the product is then necessary.

SUMMARY

According to a first aspect of the invention, there is provided a system for clearing precipitation from a window, the system comprising a window, one or more transducers, and a generator for generating an ultrasonic drive signal for the one or more transducers, wherein the one or more transducers are fixed to the surface of the window and driven by the generator to produce surface acoustic waves, wherein the surface acoustic waves propagate substantially only through a surface region of the window.

There is provided a system according to the first aspect of the invention, comprising a control system having a sensor arranged to sense ultrasonic waves emitted by one or more of the said transducers for detecting the presence of precipitation, and a controller responsive to the sensor for controlling the operation of the system or apparatus.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein:

FIG. 3C is a schematic illustration showing droplet propulsion and atomisation of precipitation using surface acoustic waves.

DETAILED DESCRIPTION OF CERTAIN INVENTIVE EMBODIMENTS

Figure 1A:
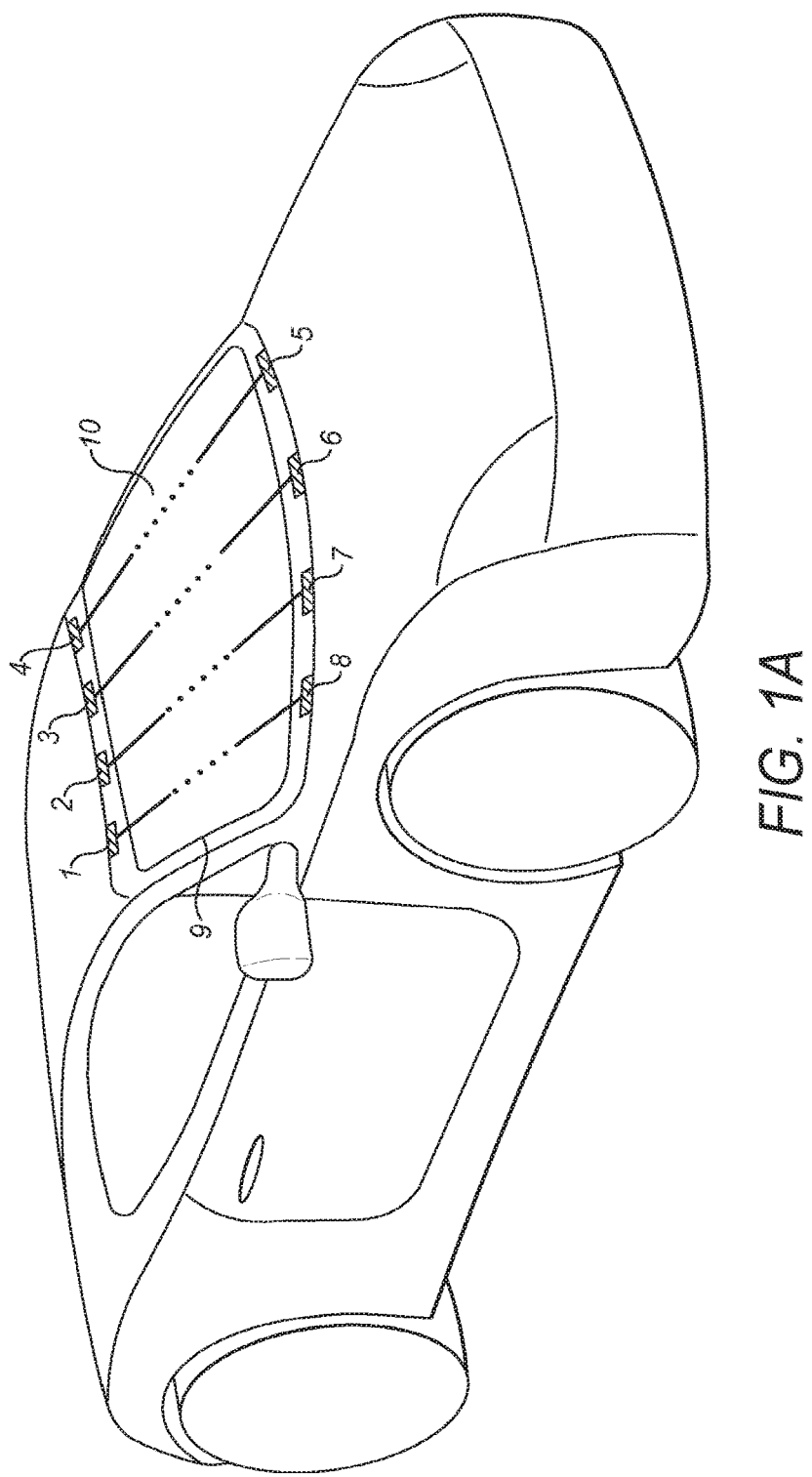
FIG. 1A is a schematic illustration showing a vehicle having transducers located in a peripheral region of a windscreen.

In the description, the term "acoustic wave" is used to refer to a wave produced by a transducer that is being driven; it does not refer to the frequency of a wave being in the audible acoustic range for people.

Precipitation includes rain, sleet, snow, ice, drizzle, mist, fog, hail or other types of precipitation. When precipitation falls onto a window of a vehicle, for example the windscreen, it impedes the view for a driver.

When precipitation falls onto a window it is attracted to the surface of the window by surface tension. The precipitation, for example liquid water, can form many droplets across the window surface. The applicant's research has found that each of the many droplets will be a different size, have a different diameter and have a different shape which may be regular or irregular. An example of a droplet size may be approximately 0.4 milliliters (ml) having a diameter of approximately 1 centimeter (cm) for example but could be much smaller. The front window or windscreen of a vehicle such as a car is inclined, for example, at an angle of 34☐. The angle may be greater. Some vehicles have windscreens inclined at a greater angle, for example 35☐ or more. A rear window may be inclined at a larger angle than the front windscreen. Large liquid droplets will run down the windscreen faster than small liquid droplets due to their larger mass and greater influence under gravity. Other effects such as surface tension of the droplet and air flow over the surface can affect how a droplet moves across the surface. Surface tension may affect small droplets more than larger droplets. As the droplet size decreases, the internal pressure of the droplet increases. For example, smaller droplets require a larger angle before running off the windscreen compared to larger droplets. In an illustrative embodiment, the merging of droplets using ultrasonic waves during operation of the system may be useful since the larger droplets may be more easily cleared from the windscreen compared to smaller droplets due to their larger mass and influence under gravity and airflow. In addition, the surface tension effects without air flow are constant and may be independent of temperature.

Embodiments of the present invention use ultrasonic waves to remove precipitation from the surface of a window. In general, ultrasonic waves are acoustic waves with a frequency above 100 kiloHertz (kHz) and up to around 50 MegaHertz (MHz) or higher. The ultrasonic waves used in embodiments of the invention have a frequency in the range of about 400 kHz to 1.5 MHz. Transducers are used to produce acoustic waves in a range of frequencies. The transducers do not operate at a single frequency but instead operate across a range of frequencies (i.e. bandwidth) either side of a central frequency. The operating frequency of a transducer is to be understood as relating to the main operating frequency or central frequency of the transducer within the bandwidth of frequencies.

In embodiments of the invention, transducers are bonded to a window surface and driven to emit acoustic waves having ultrasonic frequencies. The range of frequencies of acoustic waves emitted from the transducer are dependent on the design of the transducer.

FIG. 1A shows an embodiment of the invention wherein transducers (1-8) are positioned along the peripheral area (9) of a windscreen (10) of a vehicle. The transducers are bonded or glued to the periphery of the windscreen. There are limitations on the attachment locations of the transducers for droplet removal from a windscreen. The transducers must be positioned so as not to obstruct the view of the driver or other occupants of the vehicle. The position of the transducer on the windscreen may influence the efficiency of the transducer in terms of ability to clear precipitation from the windscreen. Any suitable number of transducers may be used for removing precipitation from the windscreen. There may be a plurality of individually spaced transducers along the peripheral area of one or more sides of the window or windscreen. The transducer may also be arranged to form a continuous strip either at the sides or top and bottom of the windscreen, or both the sides and the top and bottom. An inter-digital transducer (IDT) may be used.

Figure 1B:
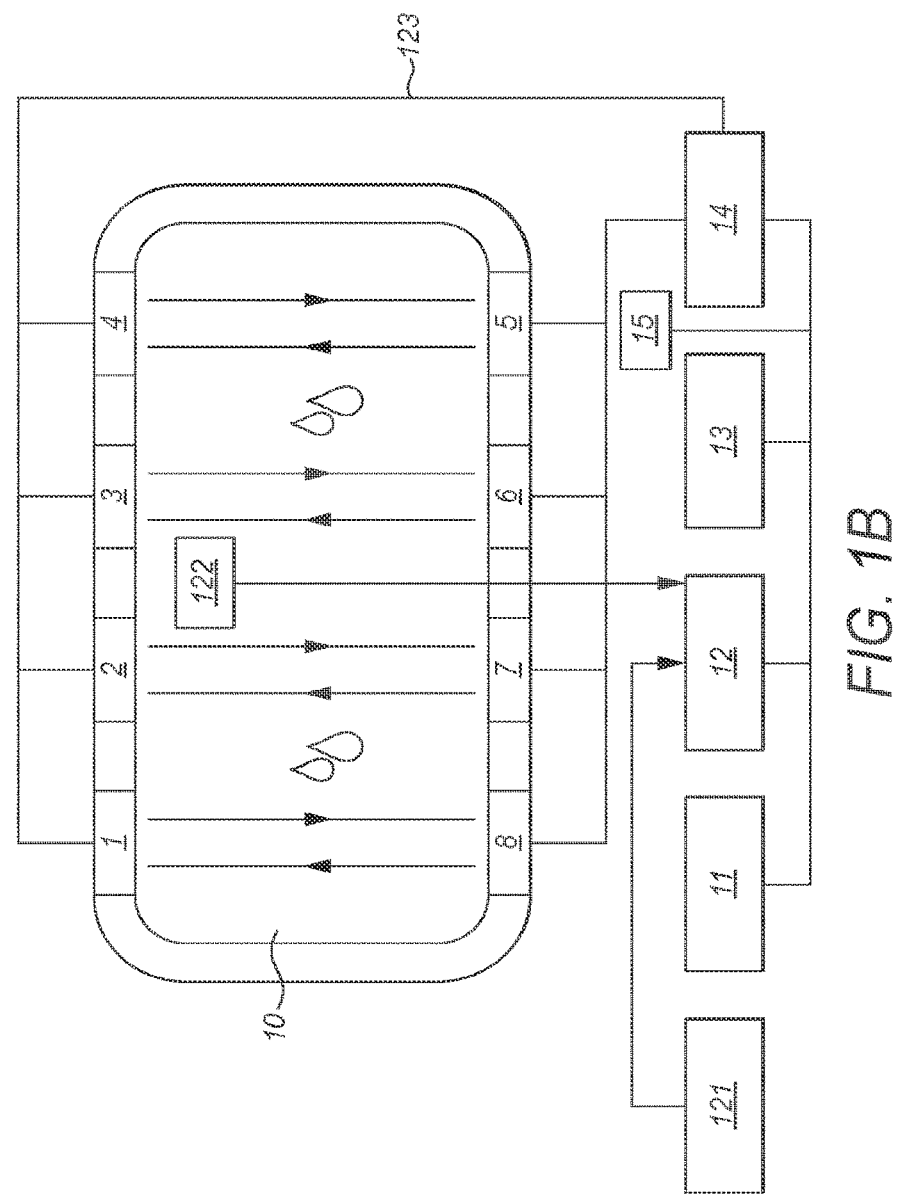
FIG. 1B is a schematic illustration showing a windscreen and electronics for operating the transducers.
Figure 2:
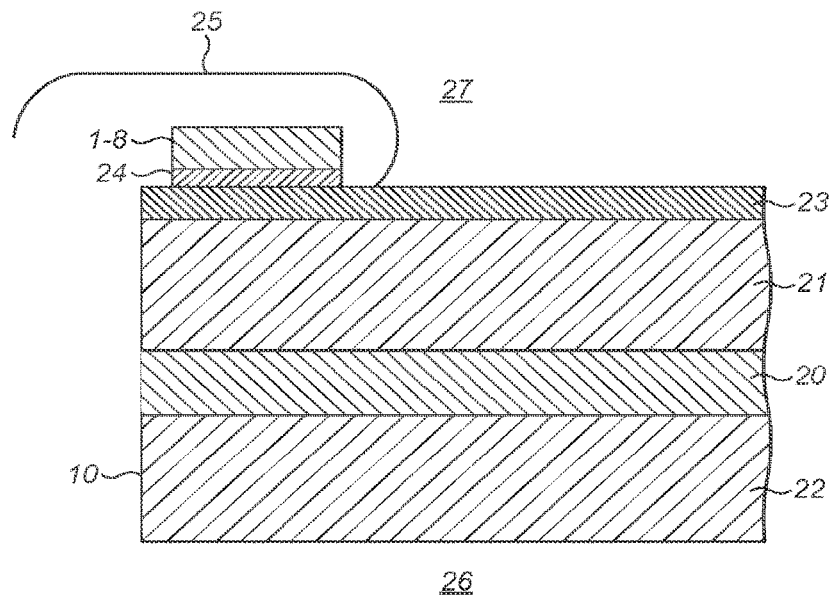
FIG. 2 is a schematic illustration showing a cross-section through a vehicle windscreen with a transducer bonded to its surface.

FIG. 1B schematically shows the driving electronics for the transducers. The transducers are connected to a driving electronics system via wiring (123) where the driving system comprises a power supply (11), a control unit (12), a frequency generator (13), a power amplifier (14), and a pulse generator (15). The power supply may be a 12V or 24V vehicle battery. The driving system may be controlled by a rain sensor (122) and/or other manual controls (121). The rain sensor can be a propriety item or can be formed using the transducers already part of the system with the appropriate additional circuitry.

The transducers are bonded to the windscreen and energised or driven by the driving electronics. Suitable bonding agents are commercially available and are used to fix each transducer to the windscreen. The bonding agent is used to form a uniform bonding layer between each transducer and the surface of the window. In an illustrative embodiment of bonding the transducers to the windscreen, the bonding agent is mixed in a vacuum to prevent air bubbles forming within the bonding layer. If gas bubbles are present in the bonding layer, ultrasonic frequencies will be highly attenuated and it could impede the efficiency of the transducers. An example of a suitable bonding agent is epoxy resin. In an embodiment, the epoxy resin may be prepared or provided in a vacuum bag ready for mixing prior to application to the windscreen and transducers, wherein the vacuum bag comprises two compartments separated by a barrier and wherein the barrier is broken in order to mix the epoxy within the vacuum bag. In an embodiment, the bonding layer is thin to minimise the refraction of sound through the multi-layered system of the glass, bonding layer and transducers. The bonding agent may have other special properties such as acoustically matching the impedance of the bonding agent to the impedance of the window surface to which they are being attached, in order to efficiently couple or transmit acoustic waves into the window by minimising unwanted reflections from the window surface. Each transducer comprises a set of electrodes as the active elements next to a piezoelectric layer, and a ground electrode. In some embodiments the transducers are attached with one electrode (for example, a ground electrode) facing away from the window and one electrode (for example, a cut electrode) adhered to the outer surface of the windscreen. In an embodiment, the transducers are bonded to the surface such that the transducer surface is parallel with the surface of the windscreen or other surface to which they are being attached.

Each transducer is driven by the frequency generator 13 and power amplifier 14 of FIG. 1B to emit a range of frequencies. The range of frequencies or bandwidth of frequencies emitted may be fixed and chosen by the designer. Alternatively the frequencies or bandwidth may be chosen by an operator. The operator may be, for example, a driver of the vehicle in which the transducer is installed. For example, the driver may have the option to select the range of frequencies emitted according to the amount of precipitation to be removed from a window, such as for heavy rain or light drizzle conditions. This can also be conducted automatically using a rain sensor. This may take the form of a dial or buttons for the driver to select within the vehicle according to the conditions. Driving the transducer causes the transducer to emit acoustic waves. The transducer design may determine the full range of operating frequencies that the transducer is capable of being driven to produce. The acoustic waves emitted depend on factors such as transducer design, contact angle between the transducer and surface to which the transducer is bonded, driving power, among other factors. The frequency and dimensions of a transducer may be chosen to affect the spread of the emitted acoustic beam from the transducer, for example, the higher the frequency selected the more focussed the emitted acoustic beam may be. The wavelength of each type of acoustic wave emitted is a function of the spacing between the electrodes of the transducer.

The transducers can be driven in continuous or pulsed mode. A pulsed generator can be used to drive the transducers in a pulsed mode. In pulsed mode the acoustic waves will be emitted from the transducer in pulses. The frequency generator may provide frequency modulated signals to produce frequency modulated acoustic waves. In an example, the frequency of the waves is driven through a range of frequencies by frequency sweeping.

Each wave consists of nodes and antinodes—nodes are regions of a wave having minimum amplitude and antinodes are regions of a wave having maximum amplitude. Standing waves occur when there is a stable superposition of waves in a system. For example, a transmitted wave and reflected wave may combine to form a standing wave due to cancellation or amplification of their frequency components. In an example, a wave traveling along the surface of the window may be reflected at the window edge due to an acoustic impedance mismatch between the window material and the surrounding medium. The reflected wave can interfere with the wave traveling in the opposite direction such that the phases of the two waves cancel each other out or combine to cause a standing wave to form. The applicant's research has found that, in an example, droplets sitting on a windscreen surface will feel the influence of acoustic waves traveling through or along the windscreen. The droplets may be observed to vibrate or move along the windscreen at different speeds which may depend upon the positions of nodes or antinodes of the waves traveling through or along the windscreen. When the transducers bonded to the periphery of the windscreen are driven, there may be a distribution of ultrasonic vibration in the windscreen, for example, the presence of maxima and minima corresponding to a spatial interference pattern. Droplets moving at a greater speed compared to other droplets may be caused by regions of the windscreens at which antinodes are located or areas close to where the transducers are located. Vibrating droplets or slow moving droplets may be located at or near a node on the windscreen or further from where the transducers are located. Droplets located close to the transducers may experience a direct sound field wherein surface acoustic waves (SAWs) are emitted and encounter a droplet before they have been reflected somewhere in the windscreen. Droplets located at greater distances from where the transducers are located may be mainly subjected to a reverberant energy field wherein ultrasonic waves may encounter the droplet from all directions or may be reflected at boundaries before encountering a droplet. Using pulsed energy may reduce the level of the reverberant field, such as for the embodiment of FIG. 5.

In other examples, droplets may vibrate and cause smaller droplets to combine with other/separate droplets to form larger droplets, which may then run off the surface of the windscreen removing the precipitation.

FIG. 2 schematically shows a cross-section through an example of the windscreen (10) of the vehicle of FIG. 1A. The windscreen consists of a laminate layer (20) sandwiched between two sheets of glass (21-22). The glass is suitable for automotive use. Due to current safety legislation measures, it is required that a vehicle windscreen be laminated, where a polyvinyl butyral (PVB) laminate is compressed between two layers of annealed glass. A nominal amount of adhesive may be sprayed onto the glass surface and heat applied to compress the laminate layer between the layers of glass. This reduces the problem associated with the destruction of a single layer of tempered windscreen glass on impact, such as during an accident, which were previously used. The laminated glass also serves to contain the passenger airbag within the cabin area of the vehicle in such circumstances. The laminate layer is a reinforcing layer that may be 0.38 millimeters (mm) thick and the sheets of glass either side of the laminate layer may each be 3 mm thick such that the total thickness of the windscreen may be around 6.4 mm thick. There may or may not be an optional coating layer (23) on the top surface of the windscreen. A transducer (1-8) is bonded to the windscreen near the edge of the windscreen or in a peripheral region of the windscreen. A bonding layer (24) attaches/fixes the transducer to the surface of the windscreen. The transducers may be affixed to the windscreen and concealed from external view. The transducers may be hidden below a rubber or plastic seal (25) which surrounds most conventional windscreens and runs along the periphery of the windscreen. The transducers are positioned so that the operation of the transducers is not affected by the presence of the rubber seal. The windscreen has an outer region (27) of the windscreen which is exposed to the weather, and an inner region (26) which relates to the interior of the vehicle to which the windscreen is fitted.

FIG. 3A is a schematic showing a transducer of FIG. 1A, 1B or 2 bonded to the surface of a windscreen which has precipitation on its surface. In this example a water droplet (30) is present on the surface of the windscreen. The transducer is driven to produce waves (31) that travel (39) along the surface of the windscreen as shown, also referred to as SAWs. The frequencies of the SAWs emitted are in the range 400 kHz to 1.5 MHz. and preferably the main operating frequency is 1 MHz. Each transducer may have a main operating frequency within a bandwidth of frequencies. For example, a transducer designed to have a main operating frequency of 1 MHz may also be driven to operate at 500 kHz within its bandwidth of frequencies. However, a transducer having a main operating frequency of 1 MHz that is driven at 500 kHz may not perform as efficiently as a transducer having a main operating frequency of 500 kHz and driven at 500 kHz. The SAWs are emitted from the transducer. The laminate layer within a vehicle windscreen is highly attenuating to ultrasonic waves and causes a damping effect. Therefore the ultrasonic waves may be confined to a region at the surface such that they do not penetrate deeply into the glass or the laminate layer. The wave frequency and mode of the transmitted wave may be chosen so as not to interact substantially with the plastic or laminate layer. Therefore, the SAWs are coupled to the surface of an object, or windscreen, and may not penetrate into the laminate layer within the windscreen. Suitable waves for this application may include Lamb waves. Rayleigh waves or other shear-type waves. Other types of waves are likely to be attenuated and dissipate their energy into the laminate layer. In addition to SAWs traveling at the surface of the windscreen, other waves (32) may also be emitted into the body of the windscreen. The other waves emitted may include longitudinal or shear-type waves. In some embodiments, the launch angle of the waves into the top layer of automotive glass may be chosen to produce the desired type of ultrasonic wave traveling through the glass.

A calibration of the transducers may be performed to optimise the operating efficiency of the system.

The SAWs will be coupled to the surface of the windscreen and on reaching the edge of the windscreen will be partially reflected (33) back into the windscreen along its surface as shown in FIG. 3A. The reflections will be due to an acoustic impedance mismatch between the glass material of the windscreen and the medium of the outer region or peripheral region (34) of the windscreen. For the frequencies of interest in the range 400 kHz to 1.5 MHz, the ultrasonic waves will be highly attenuated through air.

The applicant's research has found that when the SAWs encounter a water droplet, some of the wave energy will be transferred to the droplet via mode conversion (35) and longitudinal waves (37) may travel through the droplet. When ultrasonic waves or SAWs are applied to water droplets, the droplets may be atomised (also known as jetting or vaporisation). There are three progressive stages that can be observed including streaming (36), propulsion and atomisation.

The contact angle (38) of the water droplet to the surface will affect the angle at which the SAWs will encounter the droplet. This angle has been labelled as □R and may relate to the Rayleigh angle of Rayleigh waves traveling along the surface of the windscreen. The SAWs may be Rayleigh waves or Lamb waves. If the SAWs are Lamb waves, these may relate to anti-symmetric Lamb waves or a flexural mode. As the SAWs enter the droplet, mode conversion takes place and longitudinal waves are transmitted into the water droplet. Due to the mode conversion and transfer of energy the SAW amplitude decreases and may also be referred to as a "leaky" wave (43). The longitudinal waves transmitted into the droplet causes streaming to occur within the droplet whereby internal rotational mixing and some cavitation takes place. The next stage is exhibited by "propulsion" of the droplets, where they move rapidly at right angles to the transducers or IDT electrodes.

FIG. 3B is a schematic showing the front windscreen on the vehicle of FIG. 1A or 1B which is inclined at an angle, in this embodiment the angle is □=34□. In some embodiments of the invention the surface of the windscreen may be curved. The applicant's research has found that when droplets are propelled (40) to move along a surface, each water droplet has a leading edge (41) at the front and a trailing edge (42) at the back. The leading edge has a different shape to the trailing edge. The contact angle of the droplet with the surface is different for the leading edge and trailing edge. As discussed above, the contact angles at the edges of the droplet depend upon the surface treatment of the surface on which the droplets are sitting or moving across. For water droplets moving on an inclined surface the water droplet will have a different contact angle (38) with the surface at the advancing edge and trailing edge when compared to the contact angles of a water droplet on a flat surface. As shown a SAW emitted from the transducer is coupled into the droplet at the angle □R. In this example the SAW encounters the droplet at the trailing edge, however other SAWs may encounter the droplet at the leading edge due to being emitted from a different location around the periphery of the windscreen, or due to reflections. The other SAWs encountering the droplet at the leading edge will be coupled into the droplet at a different angle than □R.

In the example of FIG. 3C, a droplet is shown as being vaporised or atomised (44). SAWs traveling along the windscreen are able to transfer energy into the droplet causing the droplets to vibrate or resonate (45) or move along the surface. With enough energy the droplets may resonate, causing internal rotational mixing and cavitation, and burst into many smaller droplets (46) thereby being atomised. As such, the precipitation is cleared or removed from the surface of the windscreen.

The internal pressure changes within the droplet cause the droplet shape to change. The droplet shape changes by becoming skewed (48) along the direction in which the SAWs travel as shown in FIG. 3C. In this Figure, the droplet is shown on a level surface to highlight the effect that the SAWs have on the shape of the droplet. However, in other embodiments the droplet shape may also be effected by the angle of inclination of the surface. When SAWs are applied to the droplet, firstly, the droplets are seen to "stream" wherein the internals of each droplet rotates, possibly caused by cavitation. Secondly, the droplets undergo propulsion and may be observed to vibrate or be propelled to move across the surface of the windscreen. Applying SAW energy may allow the droplet to overcome surface tension and move or become propelled along the surface of the windscreen. The direction of propulsion of the droplet may be in the same direction in which the SAWs travel. The driving power of the transducers may be increased so as to effectively propel the droplets across the surface of the windscreen. During the "propulsion" process the droplets may collide with one another and form larger droplets, which due to their greater mass and reduced surface tension, may move more rapidly across the windscreen. The mechanism of propulsion may be due to streaming associated with the creation and collapse of cavities inside the liquid or due to "bubble activity" (47) arising from circulation of the liquid inside the droplet. Thirdly, the droplets may be atomised wherein the droplet is split into much smaller droplets. In this way precipitation may be cleared from a windscreen using SAWs.

The applicant's research has found that since each droplet will have a different size with varying diameters, each droplet will have a different resonant frequency and may vibrate at a preferred frequency within a range of frequencies. When a SAW with the correct frequency to match that of the resonant frequency of the droplet is encountered, the droplet will resonate in a high energy state. To "hit" the resonant frequency of each droplet the transducers may be driven to sweep through a range of frequencies. The many SAWs traveling through the windscreen, including reflected waves, may combine via superposition to locally increase their amplitude at some frequencies. The driving frequency of the transducers can be varied by sweeping through a range of frequencies. In an embodiment, this enables the SAW frequency to "hit" the resonant frequency of a droplet. In this way, the differently sized droplets may be vaporised. As the droplet size decreases, its internal pressure increases. It may therefore be easier to vaporise smaller droplets than larger droplets.

As mentioned earlier, a droplet size may be around 0.4 ml with a diameter of around 1 cm. For droplet resonance to occur an integer number of half-wavelengths may need to fit within the droplet diameter. For example, for a SAW having a wavelength of 1 cm and a droplet diameter of 1 cm, there will be two half-wavelengths of the SAW that may fit within the droplet to cause resonance of the droplet.

In other examples the precipitation may not be a water droplet but may instead be hail, snow or a layer of ice or other precipitation. For precipitation other than water droplets such as for rain, the application of the ultrasonic waves may vary to achieve a similar effect of clearing the precipitation from a window. For example, ultrasonic waves may be employed to break down a sheet of ice or frost formed over the windscreen during winter.

As discussed, to further improve the process of clearing precipitation, the outer surface of the windscreen can be treated with an optional coating. FIG. 4 is a schematic showing the effect that an optional coating layer (23) on the surface of the windscreen may have on a droplet on its surface. This optional coating will be located on the surface of the windscreen at the outer region. For example, the optional coating (23) on the outer surface may be a hydrophobic coating (49) which may be added by spraying or wiping onto the surface. A hydrophobic coating causes any water droplets on the layer to be repelled from its surface so as to minimise the contact area of the water droplet with the hydrophobic coating. In an illustrative embodiment a hydrophobic coating layer on the windscreen is preferred to aid the removal or clearing of precipitation from the windscreen surface. In an example of a transducer emitting SAWs across a hydrophobic coating, the contact angle □R1 of SAWs with the droplet will be large. Alternatively, the optional coating (23) may be a hydrophilic coating (50). If a hydrophilic coating (50) were applied to the surface of the windscreen, the contact area of the water droplet will be much larger and the contact angle □R2 of SAWs with the droplet will be small. For removing precipitation from the surface of the windscreen, a hydrophobic coating layer is preferred over a hydrophilic coating layer. Since the contact angle of the SAWs with the water droplet is larger for a hydrophobic layer than a hydrophilic layer (☐R1>☐R2), there may be more efficient mode conversion of the SAWs into the droplet and the droplet may be propelled across the surface of the windscreen more effectively. A hydrophobic coating reduces surface tension by changing the contact angle between the droplet and the windscreen surface. The air flow over the surface of the windscreen may also assist in removing precipitation from the windscreen. The contact angle between a droplet and a surface will also depend upon the viscosity of the droplet and the type of material of the surface. For example, whether the droplet is water or oil, or the surface is automotive glass or a plastic or polycarbonate material such as are used in visors for motorcycle helmets.

Figure 5:
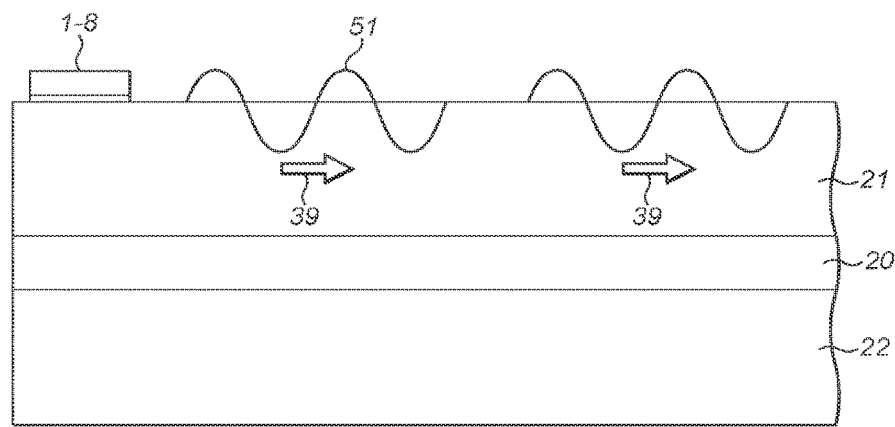
FIG. 5 is a schematic illustration showing surface acoustic waves emitted from a transducer in a pulsed mode.

FIG. 5 is a schematic showing the transducers of FIGS. 1A to 3B operating in pulsed mode. The transducers may be driven in pulsed mode since pulsing the waves (51), for example at half-second intervals, may stop the temperature of the transducers rising too much because it reduces the build-up of heat in the system. Thus allowing for a higher amplitude of input signal to remove precipitation more rapidly.

Frequency modulation may be employed to more effectively clear precipitation than amplitude modulation which may not be as effective. The transmission efficiency may also be optimised by acoustic impedance matching.

The power efficiency of the system may be optimised, since about two thirds of the energy can be transferred or lost as heat. Acoustic losses may include scattering or absorption within the system, for example at glass impurities or defects. To prevent heating effects, the circuitry and materials such as the transducers on the window may be optimised for impedance matching.

Figure 6:
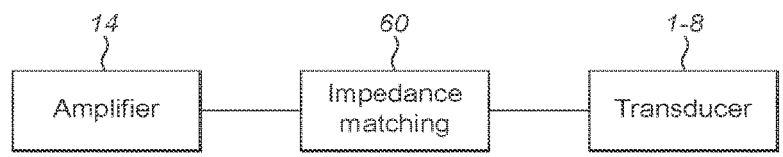
FIG. 6 is a schematic illustration showing a method for matching impedance lines in the system.

FIG. 6 schematically shows an impedance matching circuit (60) which matches the electrical impedance of the power amplifier (14) of the driving circuit to the impedance of the transducers (1-8). This improves the efficiency of the power circuit or system as a whole and reduces loss of energy from the system. There may be unwanted reflections arising from a mismatched impedance line.

Other impedances may be matched or improved matching obtained by minimising the acoustic impedance difference between the transducer and the surface to which the transducer is bonded. An anti-reflection coating can be used on the surface of the transducer to enhance the coupling of ultrasonic waves from the transducer into the surface to which it is bonded. The transducer design may be optimised to minimise the acoustic impedance mismatches between surfaces such as to maximise the coupling of waves.

Two types of transducer design will now be discussed for square and circular transducer designs. Many piezoelectric transducers are commercially available in the circular form. However, the circular design is not favoured in this application because the circular transducer design radiates acoustic energy equally in all radial directions. The square form is preferred because it radiates acoustic energy in directions that are perpendicular to its electrodes. Therefore the acoustic energy may be more closely controlled during application to a windscreen for removing precipitation. The cutting or shaping of a transducer may change its resonant frequency. In an illustrative embodiment, the electrode finger spacing of the IDT may be adjusted according to the characteristics of the transducer and the windscreen.

Figure 7A:
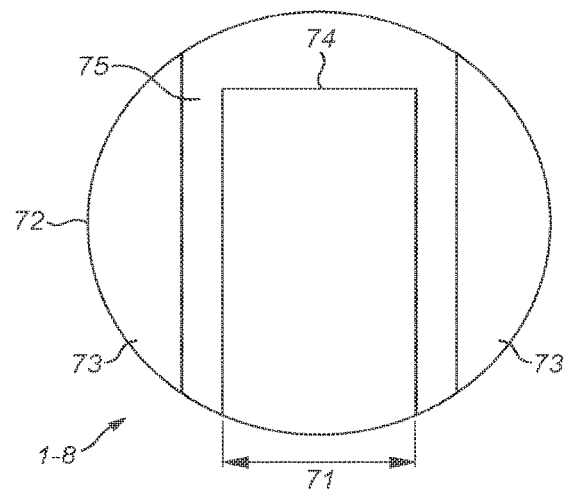
FIG. 7A is a schematic diagram showing a design for an inter-digital transducer for operation at a frequency of 500 kHz.

FIG. 7A is a schematic diagram showing an embodiment for one possible design for a transducer (1-8) of FIG. 1A or 1B, appropriate for operation at 500 kHz. The transducer shown is an inter-digital transducer (IDT). An IDT may be fabricated from piezoelectric material or by modifying the outer electrode of a standard piezoeletric transducer by cutting through the electrode and leaving the piezoelectric material uncut as much as possible. IDTs are designed to work by matching the spacing (71) of the electrode fingers to the wavelength of the waves that may be needed to be excited, depending on the application at hand. This may correspond to the frequency at which the transducer resonates. In this way it is possible to fabricate an IDT which can generate SAWs at ultrasonic frequencies. The IDT can effectively be tuned to match the physical constants of the outer glass layer of the windscreen to optimise the efficiency of the system. The transducer design shown may produce waves that penetrate to a depth of less than 3 mm from the surface of the windscreen or windshield. This will prevent the waves from suffering damping effects due to the laminate layer which is located at a depth of 3 mm into the windshield.

For the transducer in FIG. 7A, the dimensions of the transducer are shown. The dimensions of the electrodes may be specifically chosen to select an operating frequency for the transducer. In this example, the diameter (72) of the transducer is 40 mm and the first (73) and second electrodes (74) are separated by a gap (75) between the electrodes of 4 mm. The second electrode (74) is shown to be 11 mm wide, giving an electrode finger spacing (71) of 15 mm. The electrode shown operates at 500 kHz.

Figure 7B:
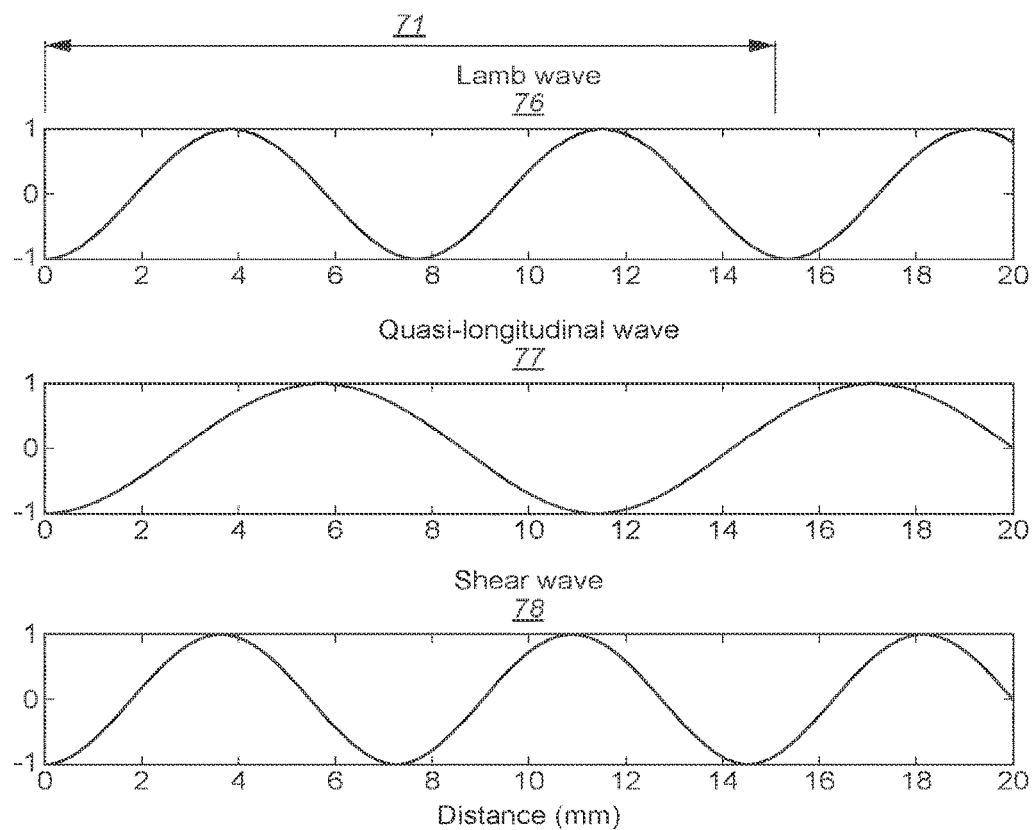
FIG. 7B is a schematic illustration showing the wavelengths of different types of waves at a frequency of 500 kHz through glass 3 mm thick.

FIG. 7B is a schematic illustration showing the wavelengths of different types of waves emitted from the transducer design of the embodiment shown in FIG. 7A for 3 mm thick automotive glass. For an electrode finger spacing of 15 mm, the wavelength of Lamb waves (76) (or Rayleigh waves) emitted will be around 7.8 mm, longitudinal waves (77) will be 10.8 mm and shear waves (78) will be around 7.0 mm. The wavelengths of these three types of wave emitted will be larger than the 3 mm thickness of the glass through which they will be traveling. The phase velocity or speed of these waves in automotive glass can be calculated using the well-known acoustic equation (c=f☐, for phase velocity, c=frequency, f×wavelength, ☐). In this example, the Lamb waves travel at around 3900 meters per second (m/s), the quasi-longitudinal waves at around 5400 n/s and the shear waves at 3500 m/s. The spacing of the electrode fingers is roughly twice the wavelength of the Lamb waves. The electrode finger spacing is around 3/2 wavelengths for the longitudinal waves such that the longitudinal waves are not excited in this particular embodiment of the invention.

Figure 7C:
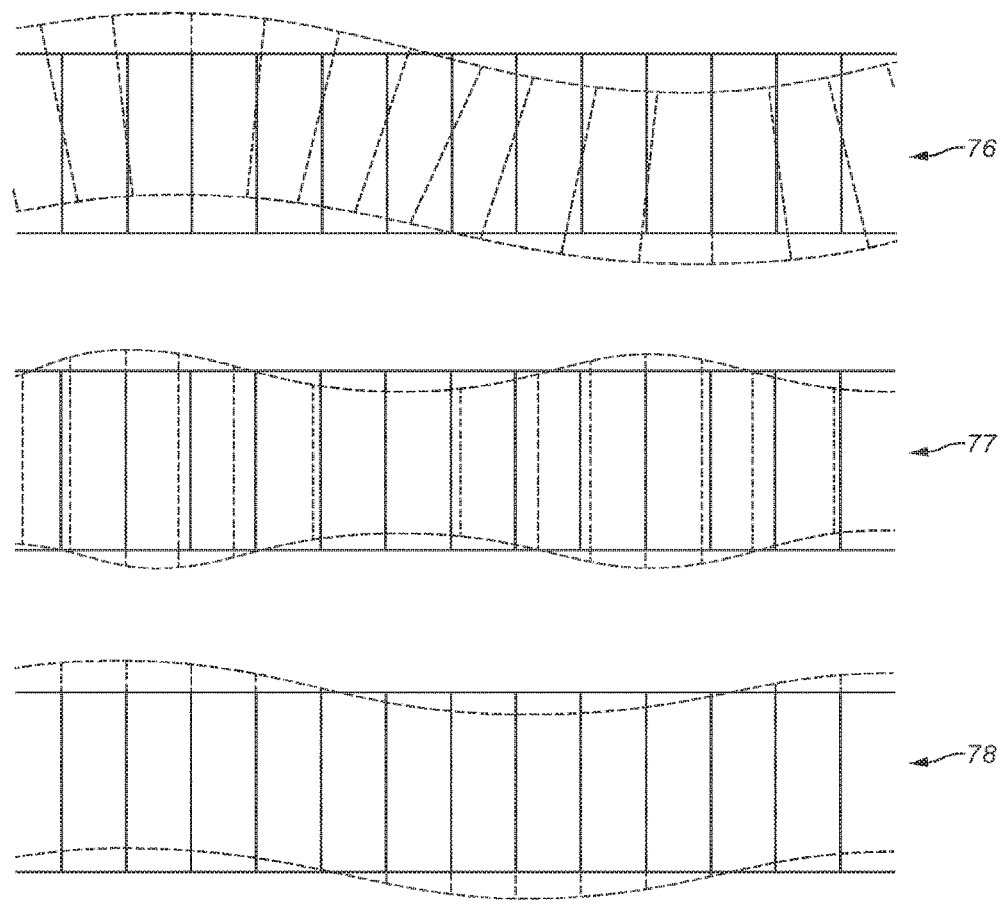
FIG. 7C is a schematic illustration of different wave types.

FIG. 7C shows examples of the types of waves that may be emitted from the different transducer designs. Other waves may also be emitted, for example Rayleigh waves, longitudinal waves or shear waves.

The speed (and hence wavelength) of waves in the automotive glass of the windscreen may vary with frequency, material properties (for example, Young's modulus, density, or Poisson ratio), and thickness of the glass. These parameters may be known within a certain tolerance or experimentally measured. For example, a laser vibrometer may be used to accurately determine the spatial field of vibration within the windscreen during the operation of the system for the purposes of obtaining a more accurate measure of the wave speeds within the glass for refining and improving the efficiency of the transducer designs.

Figure 8:
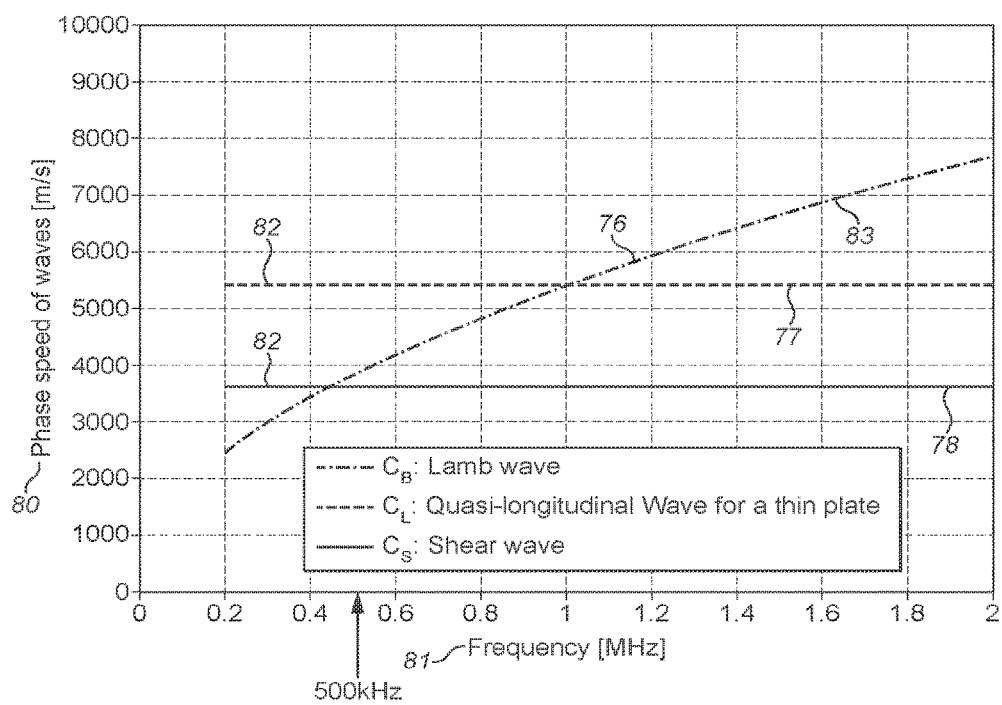
FIG. 8 is a graph showing the calculated wave speeds as a function of frequency for different types of waves traveling through 3 mm thick automotive glass.

FIG. 8 shows a graph of calculated phase velocities (80) of each type of wave (76-78) as a function of the wave frequency (81) through 3 mm thick automotive glass. These calculations are based on the assumption that the material through which the waves are travelling is a thin plate having the following parameters: thickness of glass=3 mm; Young's modulus of glass=70 GigaPascals (GPa); density of glass=2500 kilograms per meter cubed (kg/m3); and Poisson ratio of glass=0.23. The Lamb wave shown may be slightly high and relate to an anti-symmetric Lamb wave or flexural mode. The phase velocity of the longitudinal and shear waves in a chosen direction through automotive glass are relatively constant (82) at all frequencies shown. The phase velocity of the Lamb (or Rayleigh) waves increases (83) with higher frequencies. As may be seen, the shear wave speed is almost identical to the wave speed of the Lamb waves (or Rayleigh waves) at 500 kHz. This may be beneficial for effectively clearing precipitation from the surface of the windscreen.

Some square transducer designs have also been used in certain embodiments of this invention. The square transducers used are 2 cm by 2 cm and are fabricated from standard piezoelectric, such as lead zirconate titanate (PZT) material. To form the electrodes of the transducer, grooves are mechanically or laser cut into the piezoelectric material. All of the electrodes will be operated simultaneously using the same electrical signal.

Figure 9A:
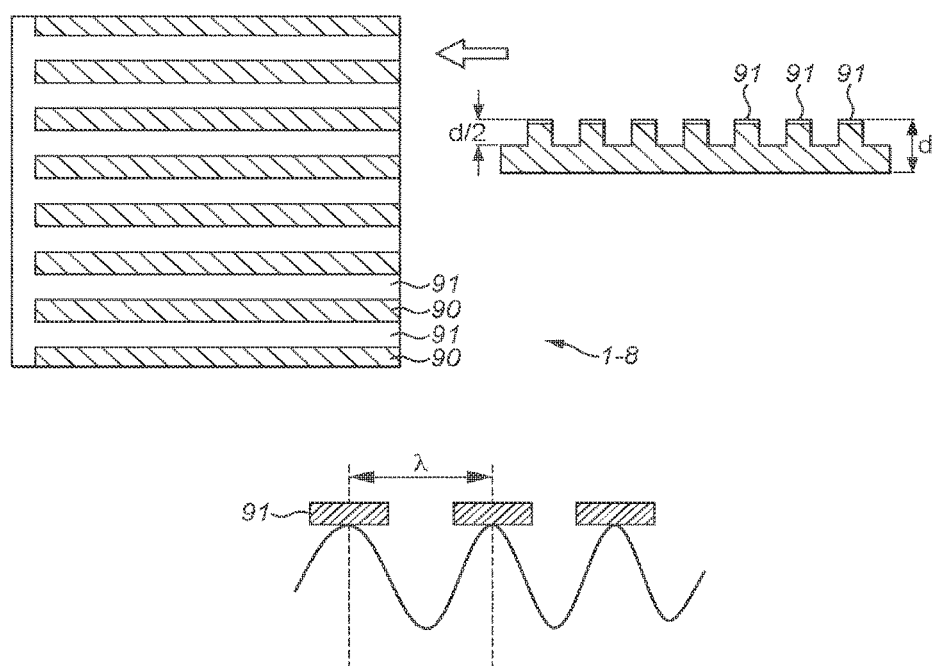
FIG. 9A is a schematic illustration showing a design for a transducer for operation at a frequency of 1 MHz.
Figure 9B:
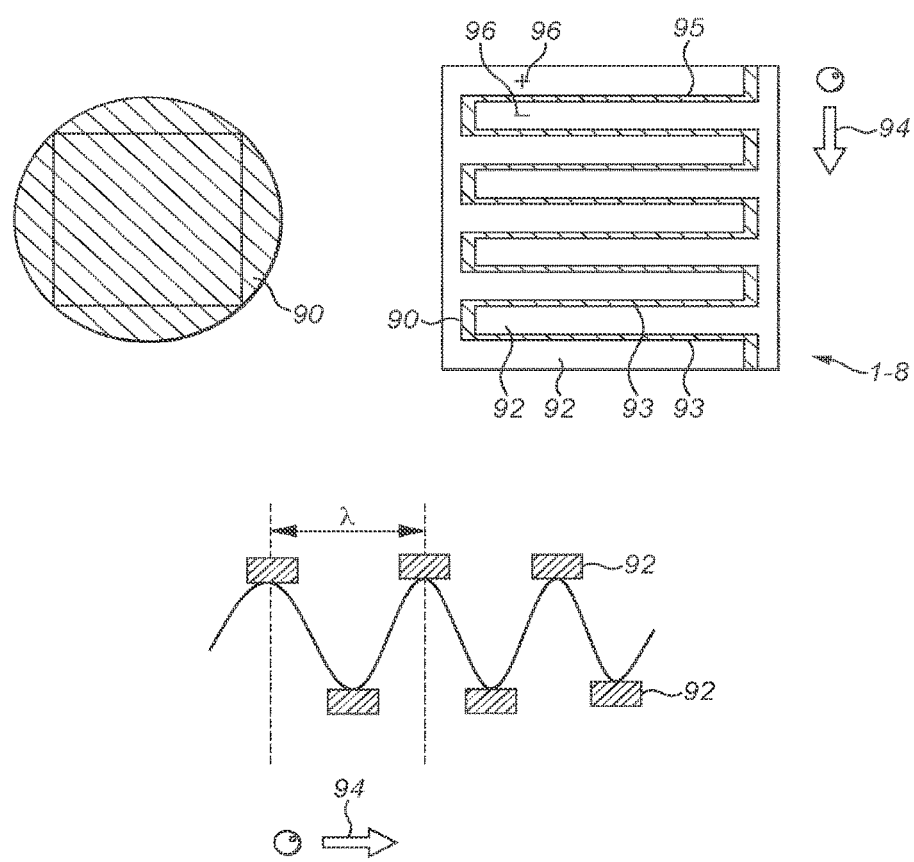
FIG. 9B is a schematic illustration showing a design for a transducer for operation at a frequency of 500 kHz.

FIG. 9A and FIG. 9B show two square transducer designs usable for the transducers of FIG. 1A or 1B. Transducers designed to operate at higher frequencies, for example at a frequency of around 1 MHz, may be smaller and generate shorter wavelength SAWs compared to transducers designed to operate at lower frequencies, for example at a frequency of around 500 kHz, which may be larger and generate longer wavelength SAWs. The preferred operating frequency may be 1 MHz and may be for a transducer having a square design (as opposed to a transducer having a circular design). In some embodiments, the thickness of the transducers are a few millimeters thick and the larger the area of the transducer the thicker the piezoelectric layer. The electrode layer sits on top of a piezoelectric material and the electrode layer is much thinner than the piezoelectric layer. In some embodiments the electrode layer is a thin film much less than 1 mm thick. The electrode layer may be cut using a laser or cut mechanically, however cutting using a laser may provide a better finish to the electrode fingers than mechanical cutting which may leave burred edges on the electrodes.

FIG. 9A shows a transducer design for a piezoelectric material (90) thickness of d=3 mm, having electrodes (91) that are 1.35 mm wide which corresponds to an operating frequency of 1 MHz (for a wavelength of 2.7 mm at a phase velocity of 2700 m/s), for an area of 2 cm by 2 cm. In this example, the electrodes (91) are adhered to the surface of the windscreen and the uncut side of the piezoelectric material faces away from the windscreen. Each electrode finger width corresponds to half of the acoustic wavelength for each of the emitted waves. Other similar example transducer designs may have electrodes that are 1.08 mm and 0.9 mm wide for operating frequencies of 1 MHz (for a wavelength of 2.16 mm at a phase velocity of 2160 m/s) and 1.2 MHz (for a wavelength of 1.8 mm at a phase velocity of 2160 m/s) respectively.

FIG. 9B shows an alternative transducer design for an IDT. This is a 2.8 cm by 2.8 cm transducer design for a square transducer which may be fabricated from a circular piezoelectric material (90) (PZT material), as shown on the left of FIG. 9B. The piezoelectric layer in this example is 4 mm thick. In this example, the cut electrodes are adhered to the surface of the windscreen with the other side, or uncut side of the piezoelectric layer, facing away from the windscreen. A ground electrode may face away from the windscreen without being adhered to the windscreen surface. The gaps (93) between the electrodes (92) may be cut using a high powered laser. The electrodes sit on top of the piezoelectric material. In this example, the gaps between the electrodes are 0.4 mm wide and resemble a square waveform pattern (95) across the electrode layer. Cutting through the electrode layer from top to bottom will form two separate parts of the transducer, each designed for an operating frequency of 500 kHz (for a wavelength of 4.32 mm at a phase velocity of 2160 m/s). In this example it may only be necessary to cut through the thin electrode layer without cutting into the piezoelectric layer, provided that a gap is created in the electrode layer to produce the two separate electrodes. The electrodes of the two parts are able to slot into one another. Each electrode has an opposite polarisation to the other. When the electrodes are combined by slotting into one another the adjacent electrodes produce alternating polarisations (96) from one electrode to the next. Electrodes may be oppositely polarised to adjacent or other electrodes so that one of the electrodes is energised with one polarity of signal and the other electrode with the opposite polarity. An example of the droplet motion (94) that may be observed relative to the transducer electrodes is shown.

The example transducer designs described may be capable of vaporising droplets of precipitation on a windscreen or other glass surface.

Figure 3A:
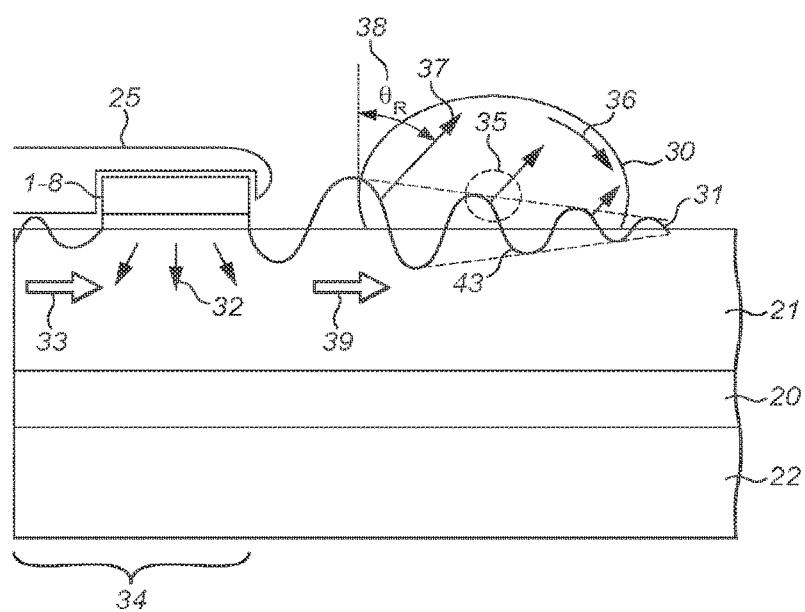
FIG. 3A is a schematic illustration showing a transducer emitting surface acoustic waves into precipitation on the surface of a windscreen.
Figure 3B:
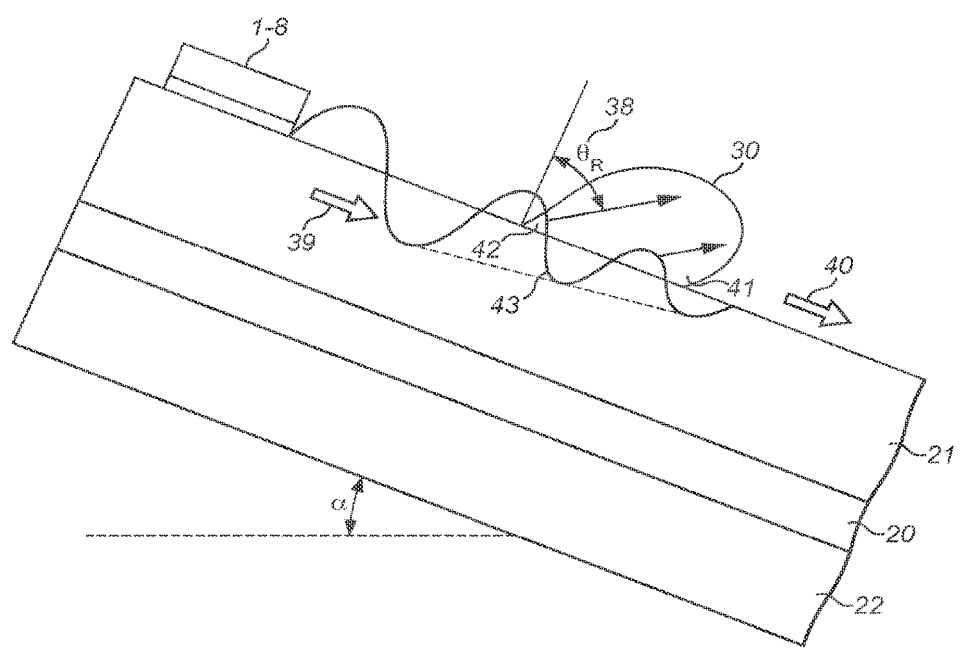
FIG. 3B is a schematic illustration showing an angled windscreen with a transducer emitting surface acoustic waves into precipitation on the surface of the windscreen.
Figure 4:
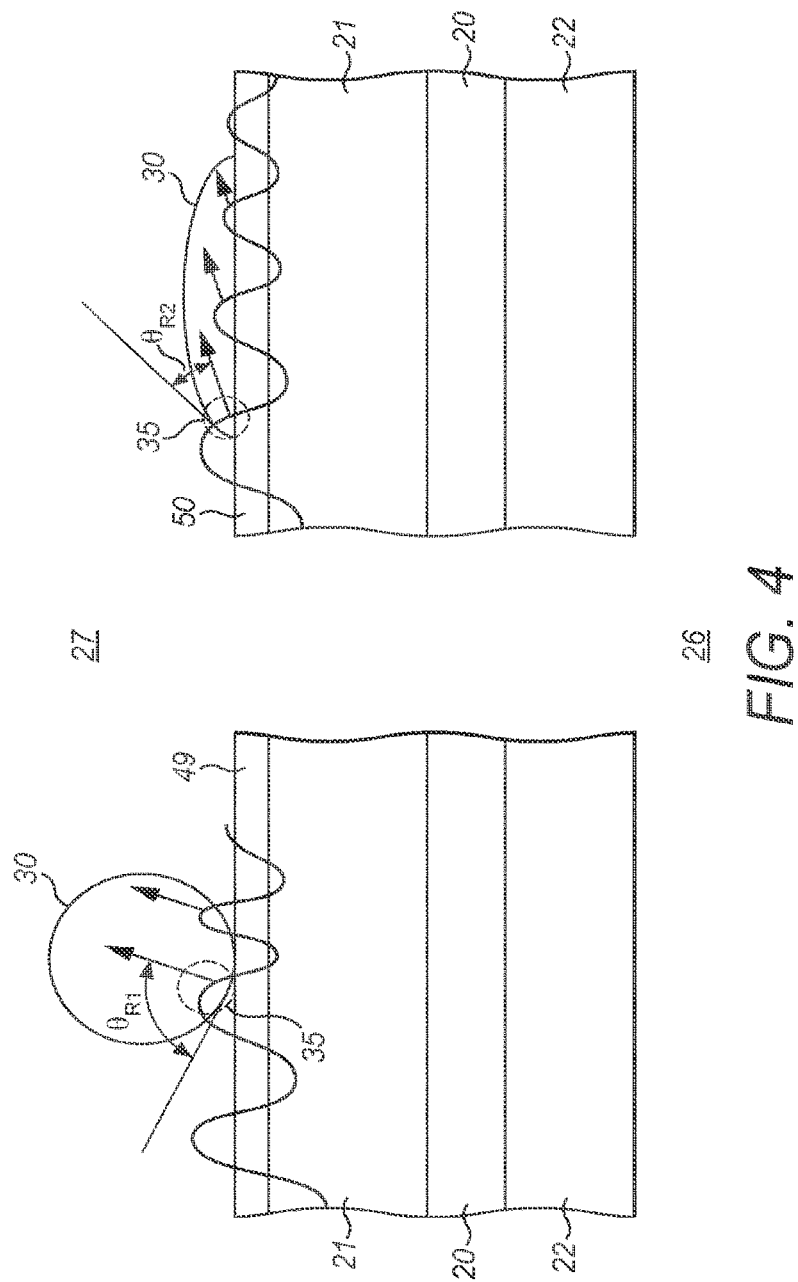
FIG. 4 is a schematic illustration showing the contact angle of precipitation for hydrophobic and hydrophilic coatings.

FIG. 3A has been shown with a laminate layer, however in other examples a laminate layer may not always be present, such as for a motorcycle helmet visor. In this example, the visor may be fabricated from a plastic or polycarbonate material. The chosen operating frequencies of the transducers for clearing precipitation from the visor in this example, may not be the same as the frequencies used in the embodiments discussed for clearing precipitation for the windscreen. For example, the frequencies of the transducers in some embodiments for clearing precipitation from a visor may be lower than those used for clearing precipitation from a windscreen.

Figure 10:
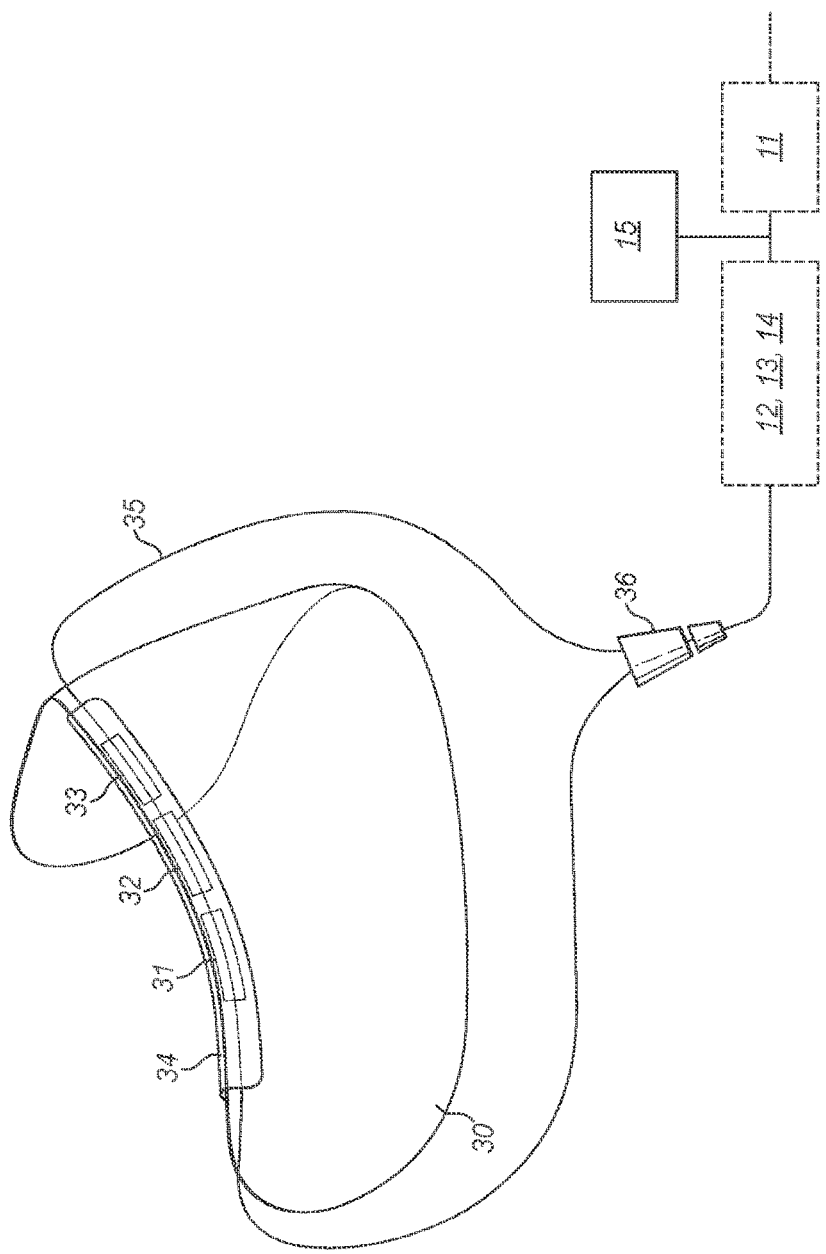
FIG. 10 is a schematic illustration of a visor having transducers attached to a visor.

FIG. 10 shows an embodiment of the invention in which transducers (1-8 or 31-33) are attached to a visor (30), for example a visor of a motorcycle helmet or other helmet, for clearing precipitation or other debris or material. In the example of a visor, the transducer may be fixed directly to the surface of the visor and operate in a similar manner as described above (for embodiments relating to a laminated windscreen in a vehicle), wherein SAWs are used to remove precipitation from the surface of the visor. The transducers may be driven by a drive system (11-15). In some embodiments the transducers are driven to operate at frequencies within the range of 100 kHz to 1 MHz. The transducers are connected to the drive system by electronic wiring (35) and a plug and socket (36). The transducers may be bonded directly to the visor or bonded to a removable clip (34) adapted to clip onto the edge of the visor, thus allowing for a change or replacement of a damaged visor. Similarly, the transducers are positioned in a peripheral region of the visor so as not to obscure the rider's vision. The visor shown does not contain a laminate layer and therefore any suitable wave may be used for clearing precipitation including SAWs. The waves may be coupled to the surface of the visor or contour of the visor so as to be effectively transmitted through the entire surface of the visor.

Other examples where a transducer and driving system may be used include a detection system for detecting the presence of rain drops or precipitation and therefore initiate the system for clearing the precipitation. In an example detection system two or more transducers may be employed. A first transmitting transducer may emit ultrasonic waves to a second receiving transducer. The receiving transducer may be able to monitor the energy of the ultrasonic waves received from the transmitting transducer. If a calibration is performed when no precipitation exists on the surface being investigated, there will be a base level of acoustic energy received at the receiving transducer. When precipitation is present on the surface the precipitation will absorb acoustic energy and the receiving transducer will observe a drop in the acoustic energy received below the calibrated base level, therefore indicating the presence of precipitation. At this point, the ultrasonic system for clearing precipitation from the windscreen surface may be switched on and the ultrasonic power can be automatically changed in line with the severity of precipitation. In this way, the transducers used for operating the system can also be used for controlling it.

Some embodiments provide the advantage of improving the power efficiency of the transducers or increasing the ultrasonic wave energy in the windscreen. The system may become more effective and efficient by carefully "tuning" the IDT. For example the IDT impedance may be matched to the windscreen or glass, or the input frequency may be pulsed. In other embodiments, several frequencies may be used to overcome standing waves on the glass, for example by sweeping through a range of frequencies, or using frequency modulation. In other illustrative embodiments bending waves or Lamb waves may be found to be more effective for inducing "streaming" or propulsion of a droplet, whilst minimising the amount of shear waves emitted which may reduce the effectiveness of the system.

Other embodiments provide the advantage of minimising the heating of the transducer, for example by using pulsed waves, which in turn allows for more power to be supplied to the system to allow for a greater area of the windscreen to be cleared of precipitation.

The use of IDTs and SAWs has the advantage of minimising any damping effect that may be caused by the existence of a laminate layer. This may minimise issues of providing enough power for droplet removal from a windshield without causing the internal laminate layer within the windshield to delaminate.

Other advantages of illustrative embodiments may be that the hydrophobic coating is not be removed or wiped off since ultrasonic transducers are used to clear precipitation from a surface that has been treated and there are no visibly moving parts across the surface of the windscreen.

Embodiments of the invention may be applied not only to laminated automotive windscreens and visors but also to laminated windows of buildings and to laminated windows used in any other situation, for example ships and boats.

Embodiments of the invention may also be applied to un-laminated windows.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A system for clearing precipitation from a window, the system comprising:
    a laminated window;
    a plurality of transducers fixed to a surface of a top layer of glass of the laminated window and operative to produce ultrasonic waves, wherein at least one of the transducers is further operative to receive the produced ultrasonic waves and to provide a signal indicative of a presence of precipitation on the laminated window upon occurrence of a drop in an acoustic energy of said received ultrasonic waves; and
    a generator for generating an ultrasonic drive signal to drive the plurality of transducers to produce the ultrasonic waves such that the ultrasonic waves propagate substantially only through the top layer of glass so as to clear said precipitation from said window.

2. A system according to claim 1, wherein the window is a laminated window comprising a laminate layer sandwiched between the top layer and a bottom layer of glass.

3. A system according to claim 1, wherein precipitation includes rain, sleet, snow, ice, drizzle, mist, fog, hail or other types of precipitation.

4. A system according to claim 1, wherein each of the plurality of transducers is configured to operate in the frequency range of 400 kHz to 1.5 MHz.

5. A system according to claim 1, wherein the generator comprises a pulse generator and wherein the ultrasonic waves comprise pulsed ultrasonic waves.

6. A system according to claim 1, wherein the generator is configured to cause the plurality of transducers to sweep through a range of frequencies.

7. A system according to claim 1, wherein the generator is configured to cause the transducer to produce waves ultrasonic waves which are frequency modulated.

8. A system according to claim 1, wherein the generator is configured to drive the plurality of transducers to produce waves ultrasonic waves such that mode conversion of the ultrasonic waves propels the precipitation.

9. A system according to claim 1, wherein the generator is configured to drive the plurality of transducers to produce wave ultrasonic waves such that mode conversion of the ultrasonic waves vaporises the precipitation.

10. A system according to claim 1, wherein the ultrasonic waves comprise surface acoustic waves.

11. A system according to claim 10, wherein the generator is configured to cause the surface acoustic waves to propagate at a depth of less than 3 millimeters from a surface of the top layer of glass.

* * * * *